United States Patent
Mega et al.

(10) Patent No.: US 11,110,938 B2
(45) Date of Patent: Sep. 7, 2021

(54) STEERING-ANGLE DISPLAY DEVICE

(71) Applicant: KABUSHIKI KAISHA TOKAI RIKA DENKI SEISAKUSHO, Aichi (JP)

(72) Inventors: Susumu Mega, Aichi (JP); Yoshiaki Nabe, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 198 days.

(21) Appl. No.: 16/463,144

(22) PCT Filed: Nov. 2, 2017

(86) PCT No.: PCT/JP2017/039725
§ 371 (c)(1),
(2) Date: May 22, 2019

(87) PCT Pub. No.: WO2018/096904
PCT Pub. Date: May 31, 2018

(65) Prior Publication Data
US 2019/0276050 A1    Sep. 12, 2019

(30) Foreign Application Priority Data

Nov. 24, 2016 (JP) .............................. JP2016-227522

(51) Int. Cl.
*B60W 50/08*    (2020.01)
*B60W 50/14*    (2020.01)
(Continued)

(52) U.S. Cl.
CPC .............. *B60W 50/14* (2013.01); *B60K 35/00* (2013.01); *B60K 37/00* (2013.01); *B60K 37/02* (2013.01);
(Continued)

(58) Field of Classification Search
USPC ....................... 701/36, 41–49, 431–432, 436
See application file for complete search history.

(56) References Cited

U.S. PATENT DOCUMENTS 4,743,883 A * 5/1988 Yoshimi ................... G01D 5/25
200/61.54
5,469,356 A * 11/1995 Hawkins .............. G05D 1/0038
701/48
(Continued)

FOREIGN PATENT DOCUMENTS

DE    102014216105 A1 *  2/2016  ............... B62D 1/28
JP    59-12006 U          1/1984
(Continued)

OTHER PUBLICATIONS

International Search Rerport issued in International Patent Application No. PCT/JP2017/039725, dated Dec. 19, 2017.

*Primary Examiner* — Jonathan L Sample
(74) *Attorney, Agent, or Firm* — Greenblum & Bernstein, P.L.C.

(57) ABSTRACT

A steering angle display device includes a display part disposed along a ring portion of a steering wheel of a vehicle; and a controller configured, during automated driving control in which a steering angle of the vehicle is controlled in accordance with road situations without rotating the steering wheel, to cause a steering angle indication indicating the controlled steering angle to be displayed at a position of the display part in accordance with the controlled steering angle.

10 Claims, 7 Drawing Sheets

(51) Int. Cl.
*B60K 35/00* (2006.01)
*B62D 1/06* (2006.01)
*B62D 6/00* (2006.01)
*B62D 15/02* (2006.01)
*G08G 1/16* (2006.01)
*B60R 16/02* (2006.01)
*B60K 37/00* (2006.01)
*B60K 37/02* (2006.01)

(52) U.S. Cl.
CPC ............... *B60R 16/02* (2013.01); *B62D 1/06* (2013.01); *B62D 6/00* (2013.01); *B62D 15/025* (2013.01); *B62D 15/0295* (2013.01); *G08G 1/16* (2013.01); *B60K 2370/782* (2019.05); *B60W 2050/146* (2013.01); *B60W 2710/207* (2013.01)

(56) References Cited

U.S. PATENT DOCUMENTS

| | | | | |
|---|---|---|---|---|
| 10,106,194 | B2 * | 10/2018 | Yang | B62D 1/046 |
| 2007/0068336 | A1 * | 3/2007 | Taguchi | B62D 1/046 |
| | | | | 74/552 |
| 2008/0143504 | A1 * | 6/2008 | Alvarez | B60K 28/066 |
| | | | | 340/439 |
| 2009/0192677 | A1 * | 7/2009 | Cech | G01C 21/36 |
| | | | | 701/41 |
| 2011/0292079 | A1 * | 12/2011 | Hosoi | B62D 15/0275 |
| | | | | 345/632 |
| 2014/0244115 | A1 * | 8/2014 | Sanma | B60K 35/00 |
| | | | | 701/42 |
| 2016/0001781 | A1 * | 1/2016 | Fung | B60K 28/02 |
| | | | | 701/36 |
| 2016/0152264 | A1 * | 6/2016 | Watanabe | B62D 15/021 |
| | | | | 701/41 |
| 2016/0159396 | A1 * | 6/2016 | Watanabe | B62D 1/04 |
| | | | | 701/36 |
| 2016/0179092 | A1 * | 6/2016 | Park | B60W 50/10 |
| | | | | 701/23 |
| 2017/0057542 | A1 * | 3/2017 | Kim | G05D 1/0088 |
| 2017/0144568 | A1 * | 5/2017 | Torii | B60N 2/767 |
| 2017/0144688 | A1 * | 5/2017 | Pitzer | B60Q 3/283 |
| 2017/0151906 | A1 * | 6/2017 | Sakuma | B62D 15/025 |

FOREIGN PATENT DOCUMENTS

| | | |
|---|---|---|
| JP | 2007-196808 A | 8/2007 |
| JP | 2010-036620 A | 2/2010 |
| JP | 2014-004984 A | 1/2014 |
| JP | 2014-069671 A | 4/2014 |
| JP | 2014-164466 A | 9/2014 |
| JP | 2016-078738 A | 5/2016 |
| WO | 2015/145674 A | 10/2015 |

* cited by examiner

STEERING-ANGLE DISPLAY DEVICE

CROSS REFERENCE TO RELATED APPLICATIONS

The present application claims the priority of Japanese patent application No. 2016-227522, the entire content of which are incorporated herein by reference.

TECHNICAL FIELD

The present invention relates to a steering angle display device.

BACKGROUND ART

A display device in a steering wheel is known which includes a light emitting source installed on at least a part of a region of an entire circumference of the steering wheel mounted in a vehicle, and a light emission controller for making the light emitting source emit light such that it is possible to visually recognize from an outside that the vehicle is under automated driving and the steering wheel is rotating (e.g., refer to Patent Document 1).

This display device in the steering wheel moves a position of the light emitting source that emits light in a reverse direction to a rotation direction of the steering wheel by an angle identical to a rotation angle of the steering wheel. The display device in the steering wheel can fix a light emitting position on the steering wheel regardless of rotation of the steering wheel.

CITATION LIST

Patent Document

Patent Document 1: JP 2014-69671A

SUMMARY OF INVENTION

Technical Problem

In a display device in a steering wheel disclosed in Patent Document 1, since the steering wheel rotates during automated driving, a driver has to keep avoiding touch the rotating steering wheel, and this bothers the driver. However, the driver does not know whether the automated driving is in progress or the driver has to drive her/himself, unless the steering wheel is rotating, and this is a psychological burden to the driver.

An object of the invention is to provide a steering angle display device that can reduce the botheration or the psychological burden to the driver.

Solution to Problem

A steering angle display device according to an embodiment of the invention includes a display part disposed along a ring portion of a steering wheel of a vehicle, and a controller configured, during automated driving control in which a steering angle of the vehicle is controlled in accordance with road situations without rotating the steering wheel, to cause a steering angle indication indicating a controlled steering angle to be displayed at a position of the display part in accordance with to the controlled steering angle.

Advantageous Effects of Invention

According to an embodiment of the invention, a steering angle display device that can reduce botheration or psychological burden to a driver can be provided.

DESCRIPTION OF EMBODIMENT

Overview of Embodiments

A steering angle display device according to an embodiment includes a display part disposed along a ring portion of a steering wheel of a vehicle, and a controller configured, during automated driving control in which a steering angle of the vehicle is controlled in accordance with road situations without rotating the steering wheel, to cause a steering angle indication indicating a controlled steering angle to be displayed at a position of the display part in accordance with the controlled steering angle.

This steering angle display device can display a current controlled steering angle by the steering angle indication on the display part, during the automated driving in which the steering wheel is not caused to rotate. Thus, a driver can easily determine whether the automated driving is in progress or the driver has to drive her/himself. Additionally, since the steering wheel does not rotate during the automated driving, the driver does not have to be attentive to the touch of a leg and the like to the rotating steering wheel. Thus, the steering angle display device can reduce botheration or a psychological burden to the driver, compared to a configuration in which this configuration is not adopted.

First Embodiment

Overview of Steering Angle Display Device 1

Figure 1A:
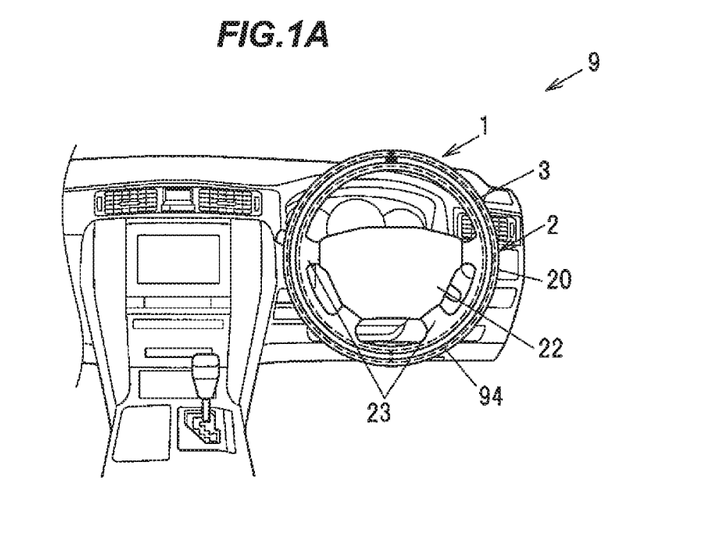
FIG. 1A is a schematic diagram of an inside of a vehicle in which a steering angle display device according to a first embodiment is installed.
Figure 1B:
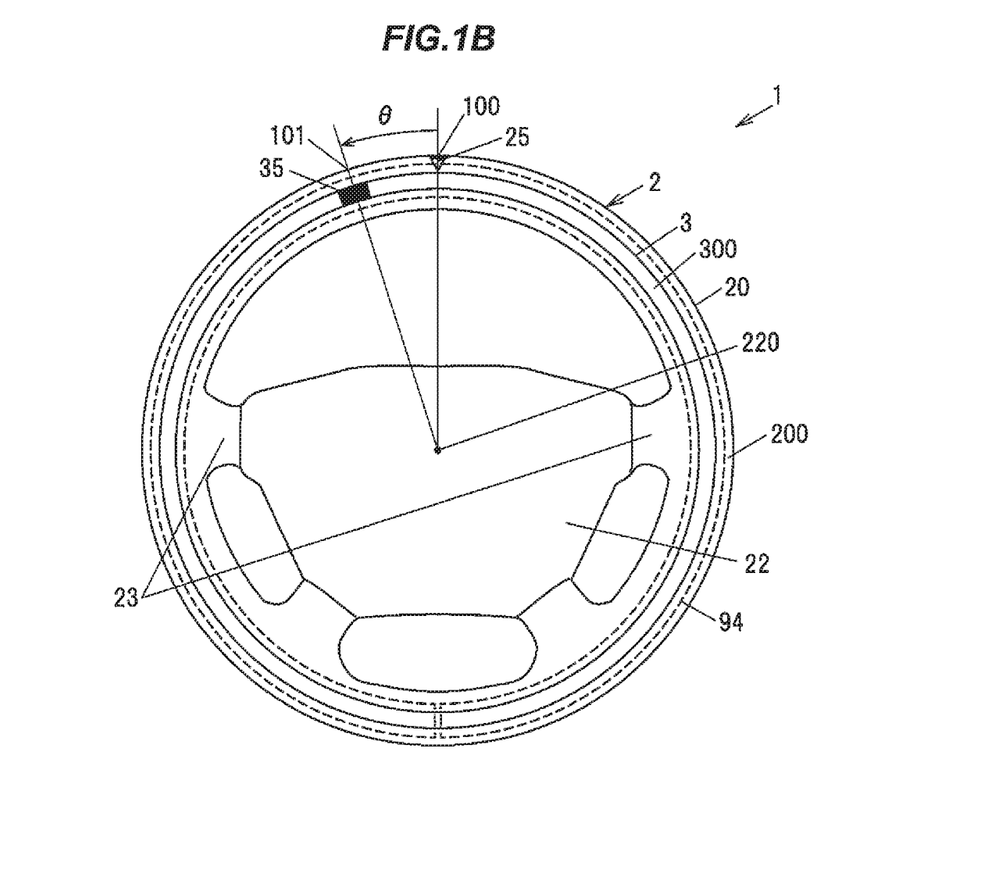
FIG. 1B is a schematic diagram illustrating a steering wheel on which a display part of the steering angle display device according to the first embodiment is disposed.
Figure 2A:
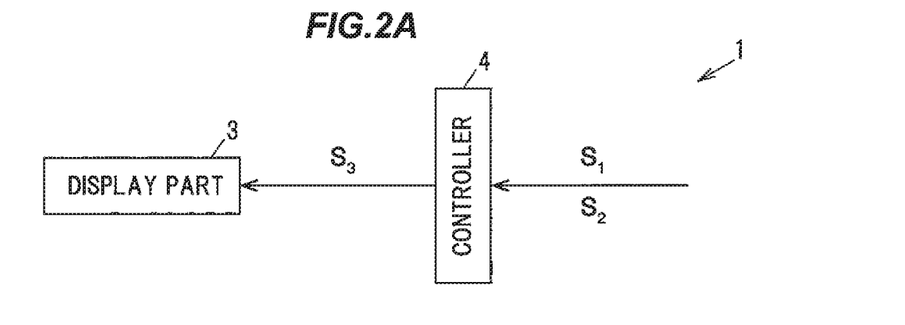
FIG. 2A is a block diagram illustrating the steering angle display device according to the first embodiment.
Figure 2B:
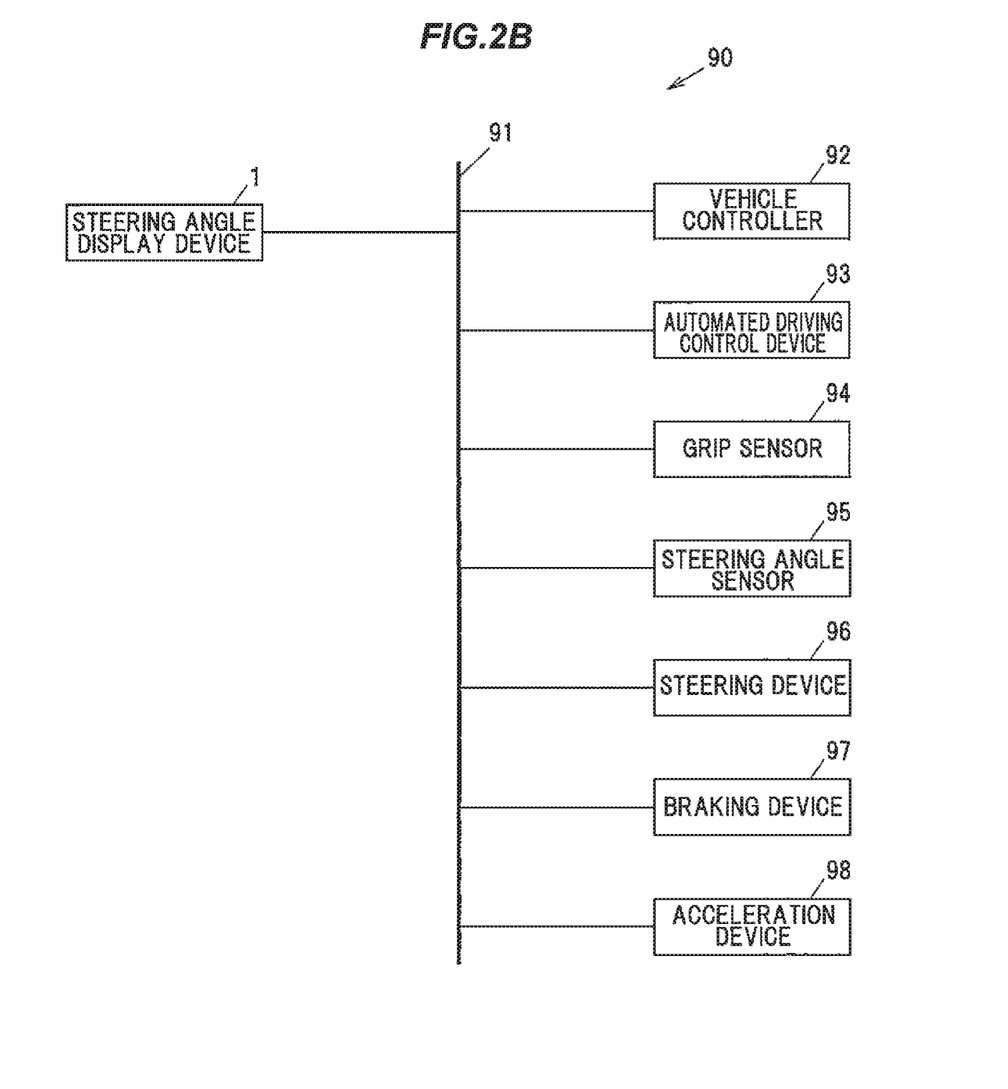
FIG. 2B is a block diagram illustrating a vehicle communication system with which the steering angle display device is connected.

FIG. 1A is a schematic diagram of an inside of a vehicle in which a steering angle display device according to a first embodiment is installed, and FIG. 1B is a schematic diagram of a steering wheel on which a display part of the steering angle display device is disposed. FIG. 2A is a block diagram of the steering angle display device according to the first embodiment, and FIG. 2B is a block diagram of a vehicle communication system with which the steering angle display device is connected. In the drawings associated with the following embodiments, ratios between elements in the drawings may be different from the actual ratios. In addition, in FIG. 2A, FIG. 2B, and FIG. 5A, arrows indicate flows of primary signals and information.

This steering angle display device 1, for example, as illustrated in FIG. 1A to FIG. 2A, includes a display part 3 disposed along a ring portion 20 of a steering wheel 2 of a vehicle 9, and a controller 4 configured, during automated driving control in which a steering angle θ of the vehicle 9 is controlled according to road situations, without rotating the steering wheel 2, to cause a steering angle indication 35 that indicates the controlled steering angle θ to be displayed at a position of the display part 3 in accordance with the controlled steering angle θ.

This steering wheel 2, for example, while the automated driving is being performed by an automated driving control device 93 illustrated in FIG. 2B, is not rotated. The automated driving control device 93, as an example, is configured to control a steering device 96, and change angles of wheels of the vehicle 9 to change a traveling direction in accordance with road situations without rotating the steering wheel 2. The steering angle θ indicates a rotation angle of the steering wheel 2 corresponding to the angles of the wheels.

Configuration of Steering Wheel 2

The steering wheel 2, as illustrated in FIG. 1A and FIG. 1B, includes the ring portion 20, which is a ring-shaped member to be gripped by the driver, a base portion 22 with which a steering shaft linked with the steering device 96 is connected and inside which an air bag, a horn device, and the like are contained, and a spoke portion 23 which links the ring portion 20 with the base portion 22.

With regard to this steering wheel 2, for example, the driver rotates the steering wheel 2 to change the angles of the wheels via the steering device 96, and the traveling direction of the vehicle 9 changes.

The steering angle θ, for example, as illustrated in FIG. 1B, is an angle from a straight line that connects a rotational center 220 of the steering wheel 2 and a reference position 100, with the angle of the steering wheel 2, when the vehicle 9 moves straight, being a reference (zero). In addition, as for this steering angle θ, a left side of this straight line is negative and a right side of this straight line is positive.

A reference mark 25 is provided by printing or the like, as illustrated in FIG. 1B, at the reference position 100 at the uppermost location of the ring portion 20. During the automated driving, the steering angle indication 35 is displayed at a position of this reference mark 25. Accordingly, even when the steering angle θ is zero, the driver can perceive that a self-driving mode is being implemented instead of a manual driving mode, from display of the steering angle indication 35.

This manual driving mode is a mode in which the automated driving control is not performed, and the driver has to operate the steering wheel 2, a braking device 97, and the like. On the other hand, the self-driving mode is a mode in which the driver does not have to operate the steering wheel 2, the braking device 97, and the like. In this self-driving mode, the steering wheel 2 is fixed at the reference position 100, and does not rotate according to the controlled steering angle θ. Accordingly, in the self-driving mode in which the steering wheel 2 does not rotate, the steering wheel 2 is stopped at the reference position 100, and thus a switch and the like that are usable during the automated driving can be disposed on the spoke portion 23.

Configuration of Display Part 3

As illustrated in FIG. 1B, the display part 3 is disposed on a side surface 200 of the ring portion 20 facing the driver. Additionally, the display part 3, for example, is disposed so as to circle substantially once from the reference position 100 as a circle starting point. Thus, a display range 300 of the display part 3 is a region circling round the ring portion 20 substantially once. This display part 3 is, for example, configured as a liquid crystal monitor.

The display part 3 is configured to cause the steering angle indication 35 to be displayed at a position corresponding to the steering angle θ according to a display control signal S3 output from the controller 4. This steering angle indication 35, for example, as illustrated in FIG. 1B, is displayed such that the position corresponding to the steering angle θ is lighted in the form of a rectangle, but is not limited thereto, a mark may be displayed, or a character, an image or the like may be displayed.

Configuration of Controller 4

Figure 3A:
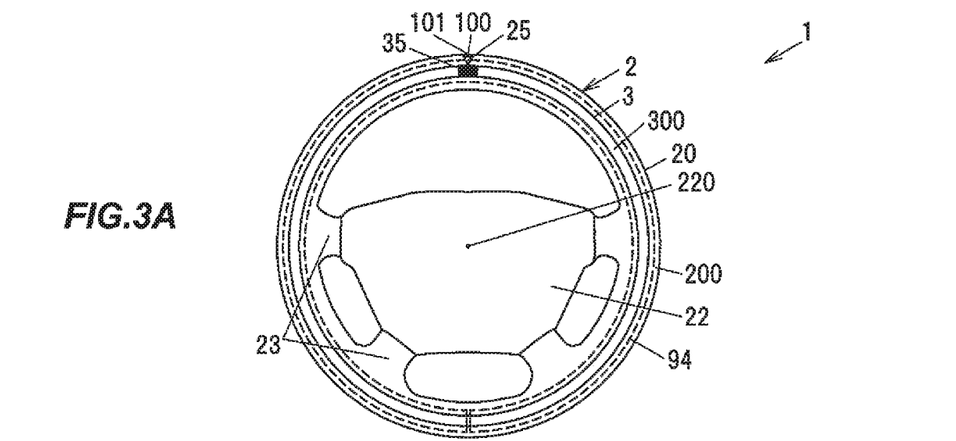
FIG. 3A is a schematic diagram illustrating display when the steering wheel of the steering angle display device according to the first embodiment is at a reference position.
Figure 3B:
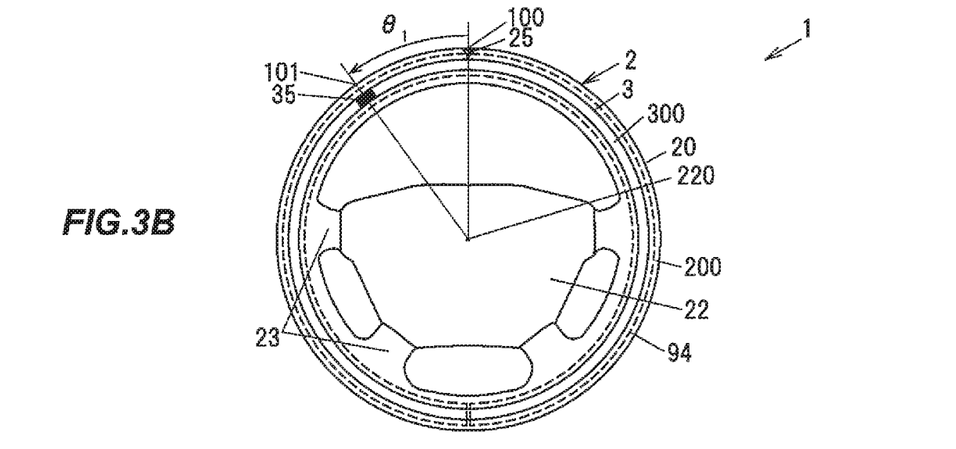
FIG. 3B is a schematic diagram illustrating display when leftward steering is performed during automated driving.
Figure 3C:
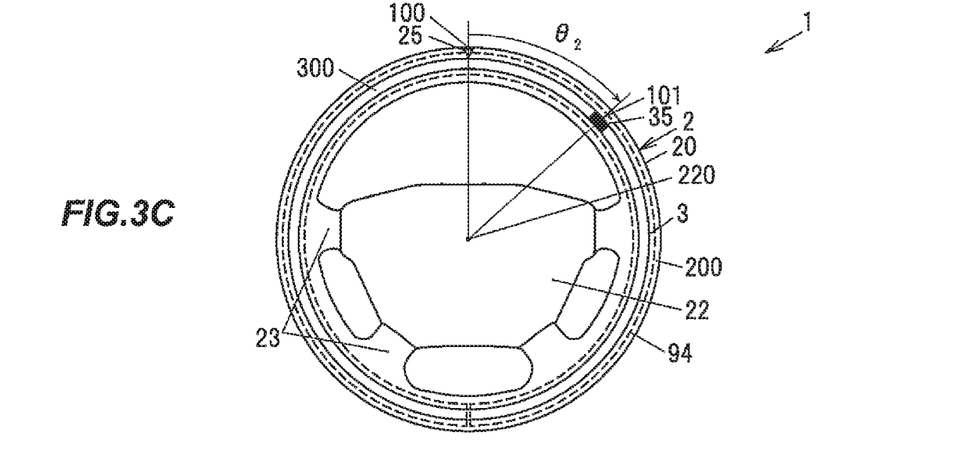
FIG. 3C is a schematic diagram illustrating display when rightward steering is performed during the automated driving.

FIG. 3A is a schematic diagram illustrating display when the steering wheel of the steering angle display device according to the first embodiment is at the reference position, FIG. 3B is a schematic diagram illustrating display when leftward steering is performed during the automated driving, and FIG. 3C is a schematic diagram illustrating display when rightward steering is performed during the automated driving.

For example, the controller 4 is a microcomputer including a Central Processing Unit (CPU) that computes and processes acquired data according to stored programs, and a random access memory (RAM) and a Read Only Memory (ROM) that are semiconductor memories. A program for operations of the controller 4, for example, is stored in the ROM. The RAM is used as a storage region that temporarily stores computation results and the like, for example.

The controller 4, for example, as illustrated in FIG. 3A through FIG. 3C, is configured to cause the steering angle indication 35 indicating the controlled steering angle θ to be displayed, at a virtual position 101 of the reference position 100 virtually moving according to the controlled steering angle θ.

Note that, the steering angle indication 35 may be implemented such that the controlled steering angle θ is displayed at a position corresponding to one lap of the display range 300. Specifically, the steering angle indication 35 follows the controlled steering angle θ within a range of about +/−180° from the reference position 100, and at an angle exceeding the range, stops the display at the following angle.

Additionally, as a modification, the steering angle indication 35 may be an image like an arrow with which a rotation direction can be visually recognized, and may be configured to follow the controlled steering angle θ. In this case, even when the steering angle θ exceeds the range of +/−180°, the steering angle indication 35 is displayed while following the angle.

The controller 4 obtains the controlled steering angle θ based on steering angle information S2 to be inputted, generates a display control signal S3 for displaying the steering angle indication 35 at the virtual position 101 indicating this steering angle θ, and outputs the generated display control signal S3 to the display part 3. This steering angle information S2 is, as an example, output from the automated driving control device 93 illustrated in FIG. 2B.

The controller 4, as described above, when the steering angle θ is zero during the automated driving, as illustrated in FIG. 3A, causes the steering angle indication 35 to be displayed at the reference position 100.

Further, the controller 4 causes, when the steering angle θ is controlled leftward by an angle θ1 from the reference position 100 during the automated driving, for example, as illustrated in FIG. 3B, the steering angle indication 35 to be displayed at the virtual position 101 at which the reference position 100 is supposed to be positioned with the steering wheel 2 rotated.

Further, the controller 4 causes, when the steering angle θ is controlled rightward by an angle θ2 from the reference position 100 during the automated driving, for example, as illustrated in FIG. 3C, the steering angle indication 35 to be displayed at the virtual position 101 at which the reference position 100 is supposed to be positioned with the steering wheel 2 rotated.

Configuration of Vehicle Communication System 90

A vehicle communication system 90 is a system for exchanging mutually signals or information among electronic devices installed in the vehicles 9. This vehicle communication system 90, as an example, as illustrated in FIG. 2B, is connected with a vehicle Local Area Network (LAN) 91, a vehicle controller 92, the automated driving control device 93, a grip sensor 94, a steering angle sensor 95, the steering device 96, the braking device 97, an acceleration device 98, and the like.

The vehicle LAN 91 is a communication network enabling communication using a Controller Area Network (CAN), a Local Interconnect Network (LIN), or the like, for example. The vehicle controller 92 is a microcomputer and controls an electronic device for a controlling system, for example.

The automated driving control device 93 controls the automated driving, for example. This automated driving control device 93 outputs a display instruction signal S1 indicating a start or an end of the self-driving mode, for example.

The grip sensor 94 is, as illustrated in FIG. 1B, provided on the ring portion 20 of the steering wheel 2, for example. The grip sensor 94 is a sensor for detecting whether the steering wheel 2 is gripped or not, and is configured to output grip information S4 when the steering wheel 2 is gripped.

The steering angle sensor 95 is configured to detect an actual steering angle of the steering wheel 2, and output steering angle information S5 of steering wheel, for example.

The steering device 96 performs power steering for assisting operation by the steering wheel 2 or steering torque adjustment, for example. Additionally, the steering device 96 is configured to change the angles of the wheels of the vehicle 9 depending on road situations and adjust the traveling direction, according to control by the automated driving control device 93, even without operation of the steering wheel 2, for example.

The braking device 97 and the acceleration device 98 are configured to accept operation by the driver, and accept an instruction from the automated driving control device 93, for example.

Figure 4:
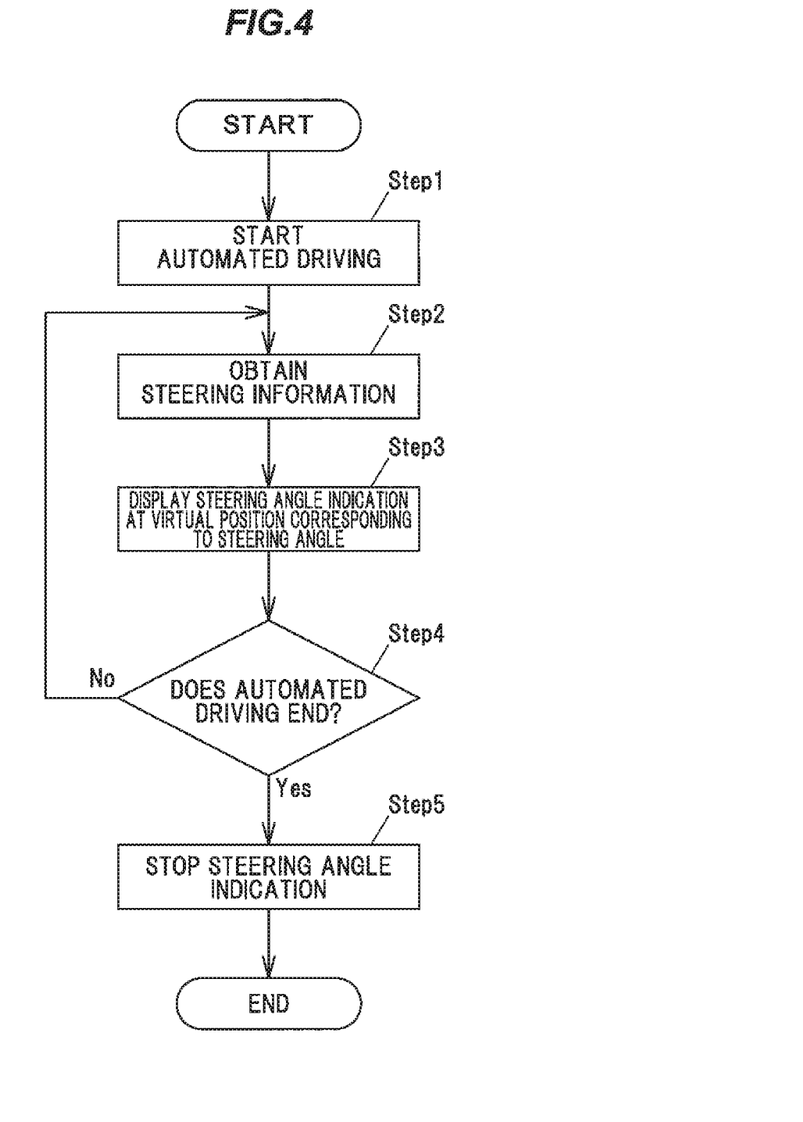
FIG. 4 is a flowchart illustrating operations of the steering angle display device according to the first embodiment.

An example of operations of the steering angle display device 1 of the present embodiment will be described below with reference to a flowchart in FIG. 4.

Operation

When the display instruction signal S1 indicating a start of the automated driving is inputted, the controller 4 of the steering angle display device 1 confirms the start of the automated driving (Step 1), and obtains the steering angle information S2 as information about the controlled steering angle θ (Step 2).

The controller 4 outputs to the display part 3 the display control signal S3 for causing the steering angle indication 35 to be displayed at the virtual position 101 according to the steering angle θ based on the obtained steering angle information S2. The display part 3 causes the steering angle indication 35 to be displayed at the virtual position 101 based on the display control signal S3 (Step 3).

The controller 4 advances to Step 2 until the display instruction signal S1 indicating an end of the automated driving is input (Step 4: NO), and causes the steering angle indication 35 to be displayed based on the steering angle information S2. The controller 4, when the display instruction signal S1 indicating the end of the automated driving is input (Step 4: Yes), stops display of the steering angle indication 35 and ends operations during the automated driving (Step 5).

Effects of the First Embodiment

The steering angle display device 1 according to the present embodiment can reduce botheration or a psychological burden to the driver. Specifically, this steering angle display device 1 can display the current controlled steering angle θ by the steering angle indication 35 on the display part 3, during the automated driving in which the steering wheel 2 is not rotated. Thus, a driver can easily determine whether the automated driving is in progress or the driver has to drive her/himself. Additionally, since the steering wheel 2 does not rotate during the automated driving, the driver does not have to be attentive to the touch of a leg and the like to the rotating steering wheel 2, and can feel relaxed. Thus, the steering angle display device 1 can reduce botheration or a psychological burden to the driver, compared to a case in which this configuration is not adopted.

Since the steering angle display device 1 need not rotate the steering wheel 2 during the automated driving, a switch and an operation unit for operating an electronic device operable during the automated driving, a trigger switch being triggers of the start and the end of the automated driving, or the like can be disposed on the spoke portion 23 and the like.

Second Embodiment

A second embodiment differs from the first embodiment in that automated driving can be canceled by appropriate operation of the steering wheel 2.

Figure 5A:
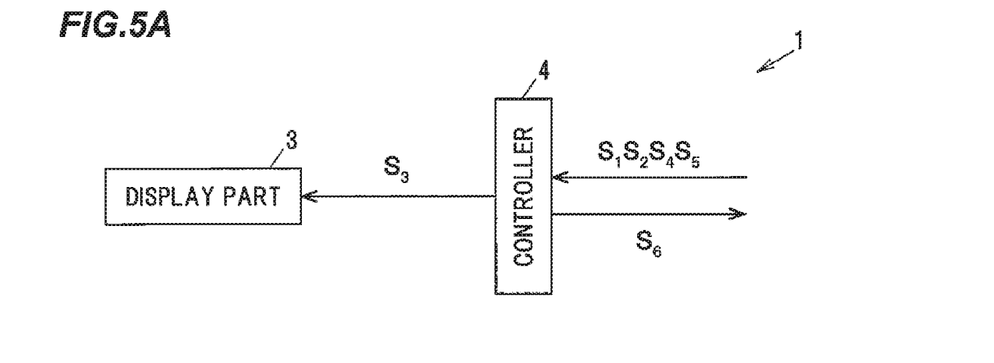
FIG. 5A is a block diagram illustrating a steering angle display device according to a second embodiment.
Figure 5B:
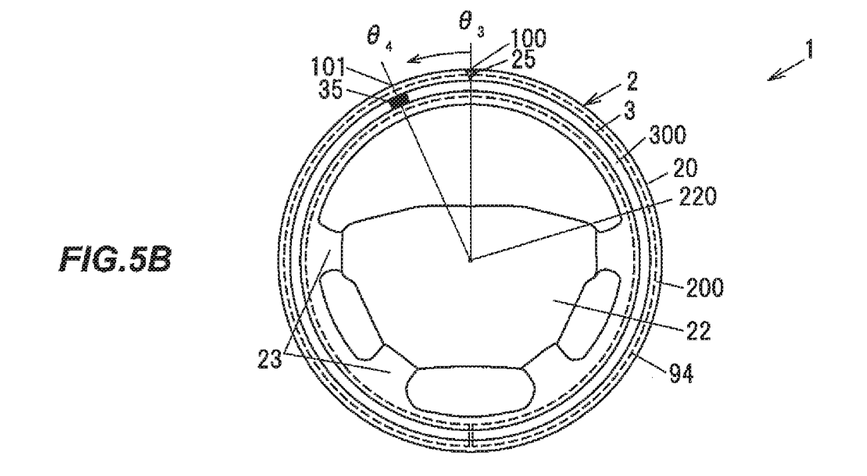
FIG. 5B is a schematic diagram illustrating operation for canceling the automated driving.
Figure 5C:
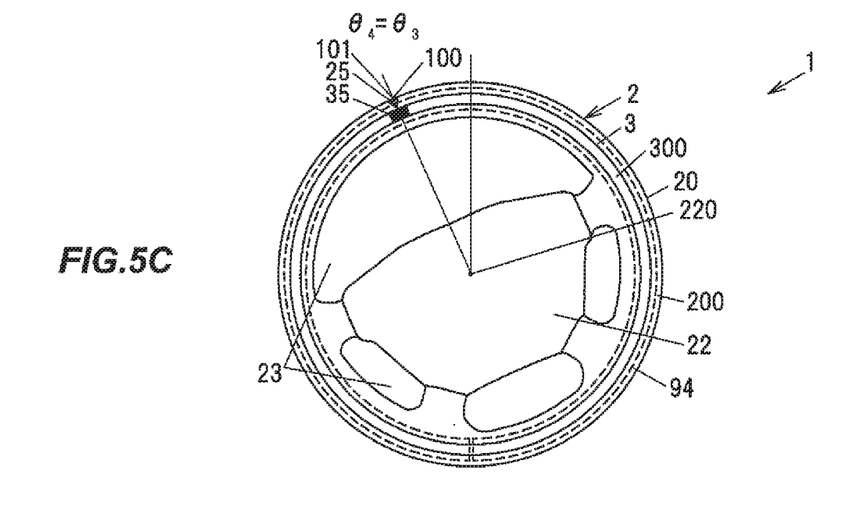
FIG. 5C is a schematic diagram illustrating the operation for canceling the automated driving.

FIG. 5A is an example of a block diagram of a steering angle display device according to the second embodiment, and FIG. 5B and FIG. 5C are schematic diagrams illustrating an example of operation for canceling the automated driving. In the embodiment described below, parts having the same functions and configurations as in the first embodiment will be given the same reference numerals as in the first embodiment, and descriptions thereof will be omitted.

The controller 4 of the steering angle display device 1 of the present embodiment is configured to, when the steering wheel 2 is operated by a driver and a position of the steering angle indication 35 and the reference position 100 of the ring portion 20 match, output a canceling signal S6 for canceling automated driving control.

The automated driving control device 93 is configured to, when the canceling signal S6 is input via the vehicle LAN 91, cancel the automated driving, for example.

Specifically, the driver, as illustrated in FIG. 5B and FIG. 5C, in order to cancel the automated driving, rotates the steering wheel 2 to match the steering angle indication 35 with the reference mark 25, for example.

The controller 4 compares a steering angle θ3 of the steering wheel 2 with a steering angle θ4 controlled by the automated driving, and when the angles match, outputs the canceling signal S6.

This steering angle θ3 of the steering wheel 2 is, for example, a steering angle detected by the steering angle sensor 95. The steering angle sensor 95 outputs the detected steering angle of the steering wheel 2 as the steering angle information of steering wheel S5 to the steering angle display device 1 via the vehicle LAN 91.

Further, for example, the controller 4, as illustrated in FIG. 5B and FIG. 5C, when the steering wheel 2 rotates, changes a position to display the steering angle indication 35 in a reverse direction of a rotation direction of the steering wheel 2, and controls the display part 3 such that the steering angle indication 35 does not move viewed from the driver.

Figure 6:
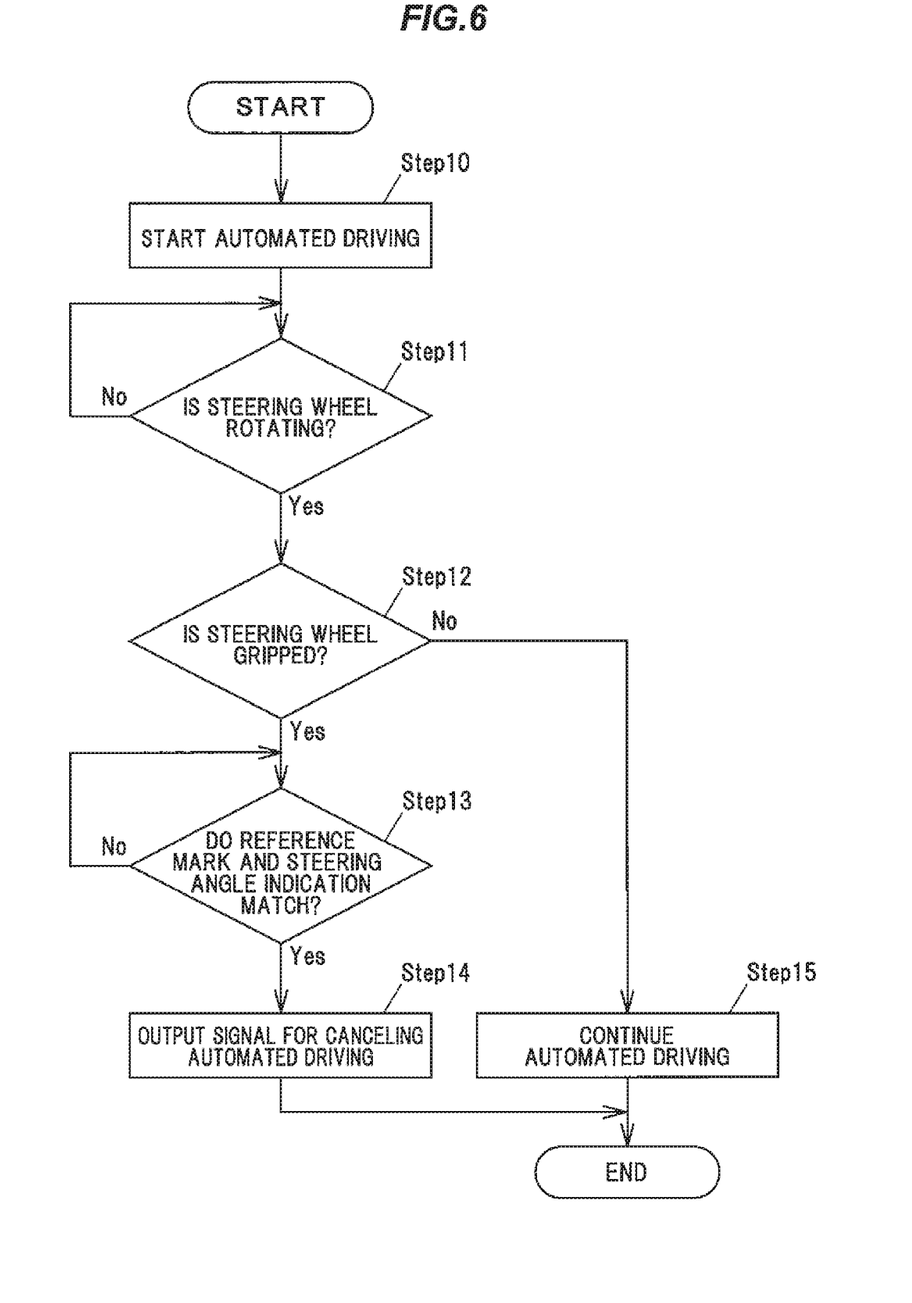
FIG. 6 is a flowchart illustrating operations of the steering angle display device according to the second embodiment.

An example of operations of the steering angle display device 1 of the present embodiment will be described below with reference to a flowchart in FIG. 6. Here, the vehicle 9 is under the automated driving.

Operation

After the display instruction signal S1 indicating a start of the automated driving is inputted and the start of the automated driving is confirmed (Step 10), then when "Yes" in Step 11 holds, that is, rotation of the steering wheel 2 is detected based on the input steering angle information of steering wheel S5 (Step 11: Yes), the controller 4 of the steering angle display device 1, confirms whether the steering wheel 2 is gripped or not.

The controller 4, when determining that the steering wheel 2 is gripped based on the grip information S4 (Step 12: Yes), monitors whether the reference mark 25 matches the steering angle indication 35 based on the steering angle information S2 and the steering angle information of S5 steering wheel, that is, whether the controlled steering angle matches the steering angle of the steering wheel 2.

The controller 4, when "Yes" in Step 13 holds, that is, when the reference mark 25 matches the steering angle indication 35 (Step 13: Yes), outputs the canceling signal S6 for canceling the automated driving to the automated driving control device 93 via the vehicle LAN 91 (Step 14). Note that, as a modification, the controller 4 may be configured to output the canceling signal S6 when the reference mark 25 matches the steering angle indication 35 for a predetermined period of time.

Here in Step 12, the controller 4, when the steering wheel 2 is not gripped (Step 12: No), stops outputting the canceling signal S6 and continues the automated driving (Step 15).

Note that, for example, as a modification, while driving is being performed on a slippery road surface in rain or snow, the controller 4 of the steering angle display device 1 may be configured not to cancel the automated driving even when the steering angle of the steering wheel 2 matches the controlled steering angle. This controller 4, as an example, is configured to determine road surface conditions based on information from the vehicle controller 92 and the automated driving control device 93.

Effects of the Second Embodiment

The steering angle display device 1 of the present embodiment can cancel the automated driving, by the operation of the steering wheel 2 by the driver. Additionally, since the steering angle display device 1 is configured to output the canceling signal S6 when the steering wheel 2 is gripped, canceling the automated driving against a driver's will, caused by a leg or the like hitting the steering wheel 2, is suppressed, compared to a case in which this configuration is not adopted.

Since the automated driving can be transited to the manual driving by operation of the steering wheel 2, the steering angle display device 1 can prompt psychological preparation for the driver to accept the manual driving, compared to a case of transition caused by notification with sound or light.

Note that, as a modification, the steering angle display device 1 may be configured not to cancel the automated driving, when only the steering wheel 2 is operated and neither the braking device 97 nor the acceleration device 98 is operated.

Third Embodiment

A third embodiment differs from other embodiments in that the steering angle indication 35 is displayed by gradation-display 36.

Figure 7A:
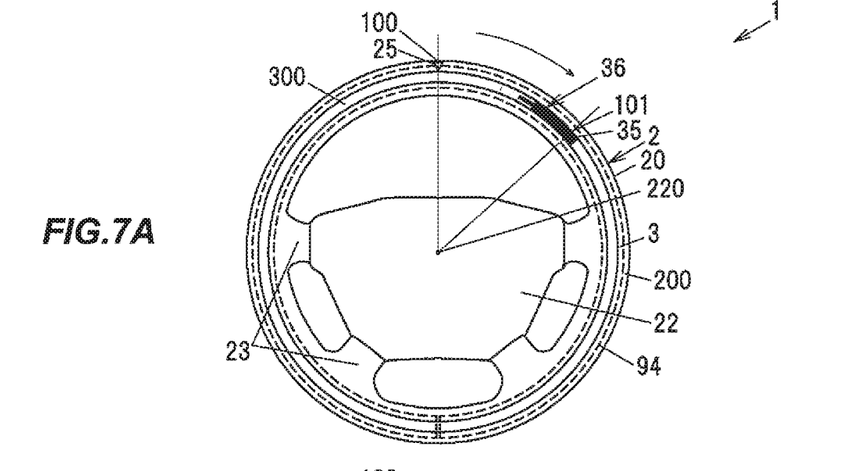
FIG. 7A is a schematic diagram illustrating a steering angle display device according to a third embodiment.

FIG. 7A is a schematic diagram illustrating an example of a steering angle display device according to the third embodiment. The controller 4 of this steering angle display device 1 is configured to, for example, as illustrated in FIG. 7A, output the display control signal S3 for making the display part 3 perform the gradation-display 36 according to a rotation direction of the steering wheel 2.

A darkest display positioned on an end of the gradation-display 36 is the steering angle indication 35 indicating the steering angle θ. The controller 4 arranges displays, which are paler than the steering angle indication 35, on a right side or a left side of this steering angle indication 35 side by side in order to form the gradation-display 36.

These pale displays are displayed so as to leave a trail in a reverse direction to an operation direction. In FIG. 7A, since the steering wheel 2 rotates clockwise, the displays become paler counterclockwise with the steering angle indication 35 being a starting point, to form the gradation-display 36.

When the display part 3 is provided along the entire ring portion 20, in the steering angle display device 1, for example, the operation direction cannot be known only with the steering angle indication 35, and thus the steering angle θ is not easily recognized. As an example, when the steering wheel 2 rotates clockwise from the reference position 100 by 200X) whether the steering wheel 2 rotates clockwise by 200° or rotates counterclockwise by 160° cannot be known only with the steering angle indication 35, when viewed from the driver.

However, in the steering angle display device 1 of the present embodiment, since the steering angle θ and the operation direction are displayed by the gradation-display 36 and trace of the operation can be observed by sight, the steering angle θ and the operation direction are easily recognized.

Fourth Embodiment

A fourth embodiment differs from other embodiments in that the display part 3 is provided on part of the ring portion 20 instead of being provided along the entire circumference of the ring portion 20.

Figure 7B:
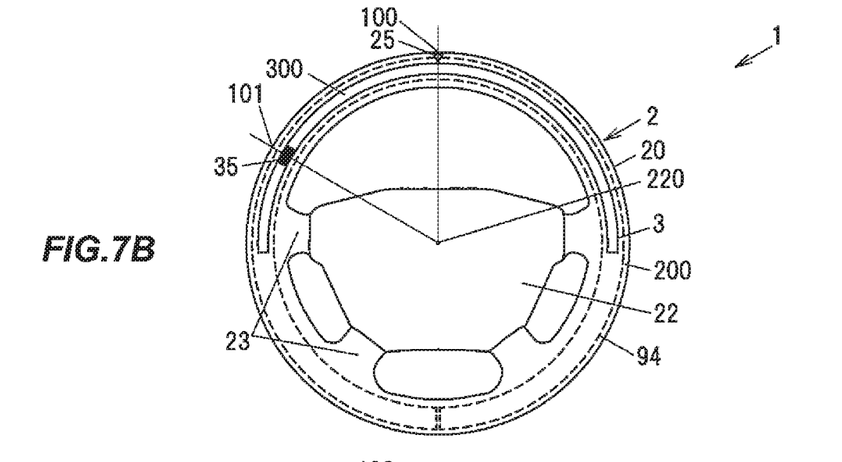
FIG. 7B is a schematic diagram illustrating a steering angle display device according to a fourth embodiment.

FIG. 7B is a schematic diagram illustrating an example of a steering angle display device according to the fourth embodiment. The steering angle display device 1 according to the present embodiment, for example, as illustrated in FIG. 7B, is not provided along the entire circumference of the steering wheel 2, but is provided on respective ranges within about 90° to left and right from the reference position 100.

This steering angle display device 1, as an example, displays the steering angle indication 35 that follows the controlled steering angle θ, until the steering angle θ reaches about +/−900. This steering angle indication 35, for example, is displayed while staying at an end portion of the display range 300, when the steering angle θ exceeds 90° to the left or right from the reference position 100.

Note that, the steering angle display device 1, for example, may be configured such that all steering angles of the steering wheel 2 are assigned so as to be capable of being displayed on the display range 300, and the steering angle indication 35 is displayed.

Fifth Embodiment

A fifth embodiment differs from other embodiments in that a plurality of light emitting sources 31 are disposed as the display part 3.

Figure 7C:
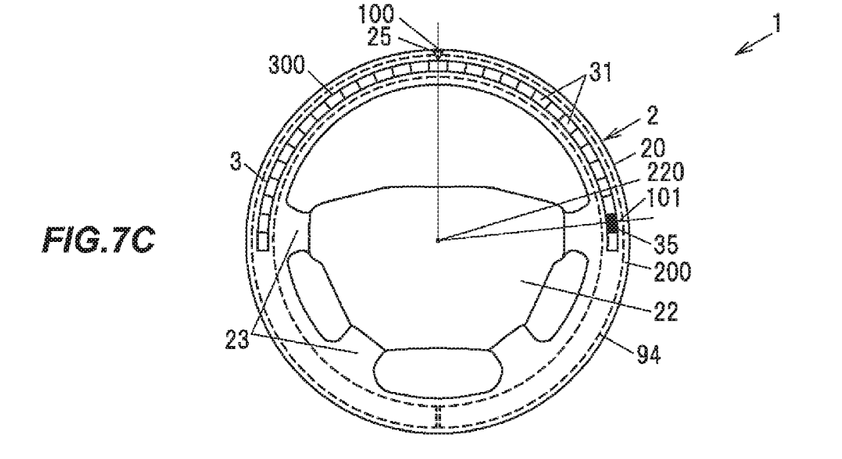
FIG. 7C is a schematic diagram illustrating a steering angle display device according to a fifth embodiment.

FIG. 7C is a schematic diagram illustrating an example of a steering angle display device according to the fifth embodiment. In this steering angle display device 1, for example, as illustrated in FIG. 7C, the display part 3 is configured of the plurality of light emitting sources 31. The light emitting sources 31, for example, are light emitting diode (LED) elements. Note that, the display part 3 may be configured such that one light emitting source 31 includes a plurality of LED elements.

According to the steering angle display device 1 of at least one of the above-described embodiments, botheration or a psychological burden to the driver can be reduced.

Although several embodiments of the invention and modified examples thereof have been described above, these embodiments and modified examples are merely examples, and the invention according to claims is not intended to be limited thereto. Such novel embodiments and modified examples can be implemented in various other forms, and various omissions, substitutions, changes, and the like can be made without departing from the spirit and scope of the invention. In addition, all combinations of the features described in these embodiments and modified examples are not necessary to solve the problem of the invention. Furthermore, these embodiments and modified examples are included within the spirit and scope of the invention and also within the scope of the invention described in the claims and equivalents thereof.

REFERENCE SIGNS LIST

1 Steering angle display device
2 Steering wheel
3 Display part
4 Controller
9 Vehicle
20 Ring portion
31 Light emitting source
35 Steering angle indication
36 Gradation-display
100 Reference position
101 Virtual position

The invention claimed is:

1. A steering angle display device, comprising:
a display part disposed along a ring portion of a steering wheel of a vehicle;
a grip sensor configured to detect whether the steering wheel is gripped by a driver; and
a controller configured, during automated driving control in which a steering angle of the vehicle is controlled in accordance with road situations without rotating the steering wheel, to cause a steering angle indication indicating the controlled steering angle to be displayed at a position of the display part in accordance with the controlled steering angle, wherein
the controller is configured to output a canceling signal for canceling the automated driving control in response to
the grip sensor detecting that the steering wheel is gripped by the driver, and
the steering angle of the steering wheel controlled by the driver matching the steering angle indication controlled by the automated driving control.

2. The steering angle display device according to claim 1, wherein the display part is disposed on left and right from a reference position, which is at an uppermost location of the ring portion in a state in which the vehicle moves straight, and
wherein the controller causes the steering angle indication to be displayed at a virtual position of the reference position that virtually moves in accordance with the controlled steering angle.

3. The steering angle display device according to claim 1, wherein the controller causes the display part to perform gradation-display up to the controlled steering angle in accordance with a rotation direction of the steering wheel.

4. The steering angle display device according to claim 1, wherein the controller is configured to, when the steering wheel is operated by a driver and a position of the steering angle indication and the reference position of the ring portion match, output a canceling signal for canceling the automated driving control.

5. The steering angle display device according to claim 2, wherein the display part is disposed in the form of a circle along an entire circumference of the ring portion on the left and right from the reference position.

6. The steering angle display device according to claim 2, wherein the display part is disposed in the form of an arc by a predetermined angle to the left or right from the reference position along the ring portion.

7. The steering angle display device according to claim 2, wherein the display part comprises a plurality of liquid crystal display parts or LED display parts.

8. The steering angle display device according to claim 1, wherein
the controller determines whether the rotation of the steering wheel is detected based on input steering angle information of the steering wheel, when the controller determines that the rotation of the steering wheel is detected, the controller determines whether the grip sensor detects gripping of the steering wheel by the driver, and when the controller determines that the grip sensor detects gripping of the steering wheel by the driver, the controller determines whether the steering angle of the steering wheel controlled by the driver matches the steering angle indication controlled by the automated driving control.

9. The steering angle display device according to claim 8, wherein when the controller determines that the grip sensor detects the absence of gripping of the steering wheel by the driver, the controller continues automated driving control.

10. The steering angle display device according to claim 1, wherein the steering angle indication follows the controlled steering angle along the ring portion within a range of +/−180° from a reference position at an uppermost location of the ring portion in a state in which the vehicle moves straight, and when the steering angle corresponds to the steering angle indication beyond the range of +/−180°, the controller controls the steering angle indication to stop at 180° from the reference position.

* * * * *